(12) United States Patent
Freitag

(10) Patent No.: US 9,123,930 B1
(45) Date of Patent: Sep. 1, 2015

(54) DUAL GLASS TO METAL SEAL CELL

(75) Inventor: Gary Freitag, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 536 days.

(21) Appl. No.: 13/457,652

(22) Filed: Apr. 27, 2012

Related U.S. Application Data

(60) Provisional application No. 61/480,582, filed on Apr. 29, 2011.

(51) Int. Cl.
*H01M 2/06* (2006.01)
(52) U.S. Cl.
CPC ..................... *H01M 2/065* (2013.01)
(58) Field of Classification Search
CPC .......................................................... H01M 2/065
See application file for complete search history.

(56) References Cited

U.S. PATENT DOCUMENTS

| | | | |
|---|---|---|---|
| 4,308,323 A * | 12/1981 | Bowsky | 429/181 |
| 4,678,358 A | 7/1987 | Layher | |
| 4,915,719 A | 4/1990 | Saffari | |
| 5,013,615 A | 5/1991 | Sisolak | |
| 6,569,542 B2 | 5/2003 | Warner et al. | |
| 6,610,443 B2 | 8/2003 | Paulot et al. | |
| 6,661,168 B1 | 12/2003 | Hartley et al. | |
| 6,759,163 B2 * | 7/2004 | Frysz et al. | 429/183 |
| 7,128,765 B2 | 10/2006 | Paulot et al. | |
| 2009/0181298 A1 * | 7/2009 | Farrell et al. | 429/178 |

OTHER PUBLICATIONS http://www.ceradyneviox.com/uploads/MarketBrochures/510201240100PMCeradyne%20VIOX%20-%20Sealing%20Glasses.pdf.*

* cited by examiner

*Primary Examiner* — Patrick Ryan
*Assistant Examiner* — Christopher Domone
(74) *Attorney, Agent, or Firm* — Steven W. Winn

(57) ABSTRACT

An assembly of at least two glass-to-metal seals utilized in an electrochemical cell is described. The assembly of a first and second glass-to-metal seals is constructed with respective insulating glasses having different softening points. The assembly of glass-to-metal seals is constructed in a sequential order progressing from insulating glasses having a greater softening point to a lower softening point. Each of the plurality of glass-to-metal seals are created through subjecting the insulating glass and lead combinations through a series of individual heat treatments, each sequential heat treatment having a maximum temperature that is less than the previous heat treatment and less than the softening point of the insulating glass within the prior glass-to-metal seal.

28 Claims, 3 Drawing Sheets

DUAL GLASS TO METAL SEAL CELL

CROSS-REFERENCE TO RELATED APPLICATION

The present application claims priority based on U.S. provisional application Ser. No. 61/480,582, filed Apr. 29, 2011.

BACKGROUND OF THE INVENTION

1. Field of the Invention

The present invention generally relates to the conversion of chemical energy to electrical energy and, more particularly, to a glass-to-metal seal (GTMS) for hermetically sealing an electrochemical cell. The glass-to-metal seal is considered critical because it hermetically isolates the internal environment of a component from the external environment to which the component is exposed. In electrochemical cells powering implantable medical devices, the GTMS hermetically seals the internal cell chemistry from the external device environment.

2. Prior Art

The glass-to-metal seal of an electrochemical cell typically consists of a ferrule sleeve secured to an opening in the cell casing, such as in the lid or in the casing body itself. The ferrule supports an insulating glass in a surrounding relationship and the glass in turn seals around the perimeter of a terminal lead. The terminal lead extends from inside the cell to a position outside the casing, and serves as the lead for one of the cell electrodes. Typically the terminal lead is connected to the cathode current collector. The casing including the lid serves as the second terminal for the other electrode, typically the anode. This configuration is referred to as a case-negative design.

To construct a glass-to-metal seal, insulating glass is generally provided in a ring or tubular shape to fit inside the ferrule sleeve or inside an opening in the casing body. The insulating glass has a hole through its center that receives the terminal lead. These components are assembled in a closely spaced relationship and then heat treated in a furnace. This heating step causes the glass to soften and flow into intimate contact with the inside of the ferrule and with the perimeter of the terminal lead. When the assembly cools, the insulating glass is bonded to the ferrule and the terminal lead creating a glass to metal seal therebetween.

In some electrochemical cell constructions, two or more terminal leads with respective glass-to-metal seals are utilized. Each of these terminal leads may be electrically connected to the current collector of the cathode, the anode or they may be connected to the casing of the cell to facilitate proper operation.

There have historically been various methods in the construction of these multiple terminal lead electrochemical cells. One method forms multiple glass-to-metal seals of the terminal leads simultaneously. More specifically, the insulating glass is positioned about the perimeters of the first, second, or more of the terminal leads. The glasses and leads are placed inside the ferrule sleeve or inside respective openings in the casing body in a closely spaced relationship. The assembly of leads is then heated to form the multiple GTMS at one time. This method of simultaneously forming the plurality of GTMS is not ideal because it requires complex tooling. Each terminal lead must be located independently to account for expansion of the header and tooling at the glassing temperature. These components ensure the proper positioning of the multiple leads within the header during the heating process. Furthermore, if the header is too small, there may not be sufficient space for the leads and their associated lead locating components.

The second option is to form the glass to metal seals independent of each other. In this method, individual ferrules or sleeves are used to isolate each of the terminals. This second option is not ideal because the current process requires multiple positioning components and additional processing steps.

What is therefore needed is an electrochemical cell comprised of a multitude of glass-to-metal hermetically sealed terminal leads and a forming process thereof that does not require the use of special lead positioning components or processing steps. The present invention provides an electrochemical cell with multiple glass to metal seals and a manufacturing process thereof that overcomes the shortcomings of the prior art.

SUMMARY OF THE PRESENT INVENTION

The present invention is directed to an electrochemical cell and a method of manufacture thereof wherein multiple terminal leads which are individually hermetically sealed by fusing glass to metal. More specifically, the present invention is directed to an electrochemical cell and manufacturing method thereof having multiple terminal leads that utilize different glass compositions to form individual hermetic seals between the lead and the case or housing of the cell.

The electrochemical cell of the present invention utilizes a multitude of insulating glasses, each having a different glass softening and working temperature. In a preferred embodiment, at least two insulating glasses, each of which have a different glass softening and working temperature, are utilized to hermetically seal the terminal leads within the header of the cell casing. A series of separate heat treatments or thermal profiles, each profile of decreasing maximum temperature, is used to soften a single glass composition and seal the terminal lead therewithin. This method of utilizing heat treatments of decreasing maximum temperatures, each of which are below the softening point of the prior insulating glass or glasses used, thereby ensures that the hermetic integrity of the prior hermetic seals are not compromised.

A first glass, having a glass softening temperature greater than a second insulating glass, is positioned about a first terminal lead within a first opening of the casing header. The first glass and first terminal lead are then heat treated at a first melting temperature greater than the softening point of the first glass forming a first glass to metal seal therebetween.

Subsequently, the second insulating glass, having a second glass softening point that is lower than the softening point of the first insulating glass, is positioned about the second terminal lead within a second opening of the cell header. The second glass and second terminal lead are then heat treated at a second melting temperature forming a second glass to metal seal therebetween. The second melting temperature has a maximum temperature that is lower than the softening point of the first insulating glass.

In so doing, the first glass to metal seal formed between the first terminal lead and the first glass is heat treated a second time, at the lower softening point of the second glass. However, since the softening point of the second glass is lower than the softening point of the first insulating glass, the first glass to metal seal between the first terminal lead and the cell header remains hermetic and is not compromised. The process could therefore be repeated forming additional glass to metal seals utilizing a third, a fourth or more insulating glasses which compositions having sequentially lower softening points. Once the cell header assembly incorporating the multiple hermetically sealed terminal leads is complete, the terminal leads are electrically connected to the components residing within the electrochemical cell. The electrochemical cell is then hermetically sealed such as by laser welding the header lid or top portion of the cell casing to the body of the cell casing.

These and other objects of the present invention will become increasingly more apparent to those of ordinary skill in the art by reference to the following description and the appended drawings.

DESCRIPTION OF THE PREFERRED EMBODIMENTS

A hermetic glass-to-metal seal consists of a terminal lead electrically isolated from a ferrule or the casing body by an insulating glass. The individual materials chosen for these applications are critical and must meet the following design criteria. First, the terminal lead must be corrosion resistant to the internal cell chemistry, be weldable and modifiable for attachment to the end users product, and have sufficient electrical conductivity for the particular cell design. Secondly, the insulating glass needs to be corrosion resistant to the internal cell chemistry, and have sufficient electrical insulation for the particular cell design. Lastly, the ferrule or casing body must be corrosion resistant to the internal cell chemistry, have sufficient electrical conductivity for the particular cell design, and be weldable for secondary operations.

These components are manufactured into a glass-to-metal seal by assembling the components together, followed by heating in a furnace. The furnace may comprise a tube furnace, a box or batch furnace, a continuous belt furnace or the like. The furnace may also comprise a single or a plurality of heating zones within which the heating profile may be the same or different from other heating zones. The resultant seal must also meet the following design criteria: the assembly must be hermetic, the insulating glass must exhibit acceptable visual characteristics, i.e., have no cracks that affect function, and there must be sufficient electrical insulation between the ferrule or casing body and the terminal lead for the cell design. Also, the glass-to-metal seal must exhibit acceptable thermal durability to secondary processing such as welding and it must be mechanically tolerant to secondary processing such as terminal lead bending. The resulting seals provide all of the critical design criteria for the use in an electrochemical cell of the type intended to power an implantable medical device.

Figure 1:
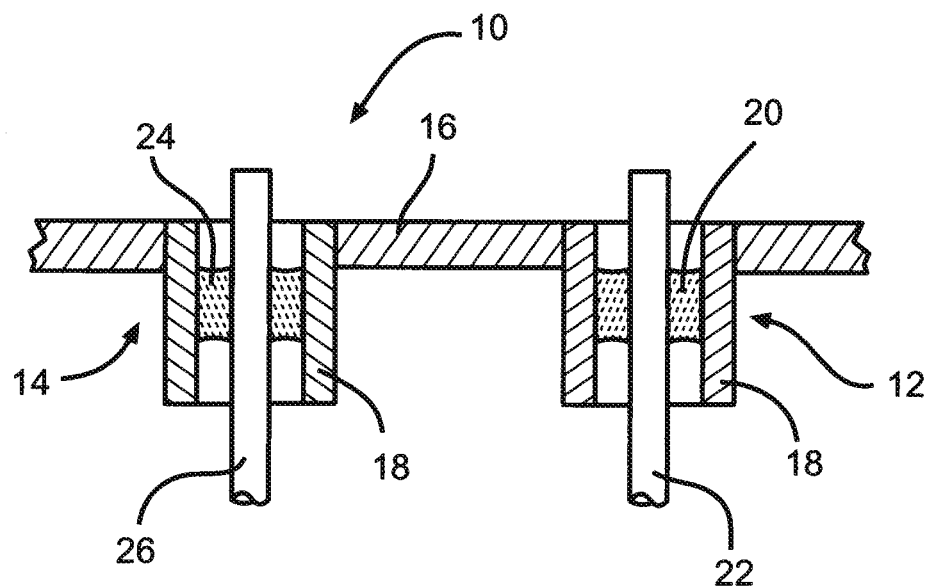
FIG. 1 is a schematic view of an embodiment of an assembly of glass-to-metal seals of the present invention having a ferrule supporting the insulating glass.
Figure 2:
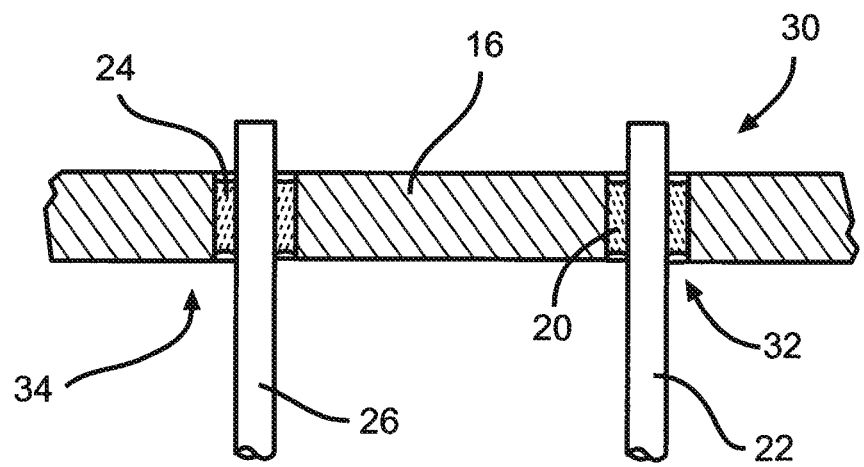
FIG. 2 is a schematic view of an embodiment of an assembly of glass-to-metal seals of the present invention having the glass sealed directly to the casing.

Turning now to the drawings, FIGS. 1 and 2 show exemplary embodiments of glass-to-metal seals of the present invention. These glass-to-metal seal embodiments are utilized in electrochemical cell designs. As shown in FIG. 1, one exemplary embodiment is of a combination comprising at least two glass-to-metal seals 10. A first glass-to-metal seal 12 and a second glass-to-metal seal 14 are shown. Each of the glass-to-metal seals 12, 14 comprise a casing 16 having an opening sized to receive a ferrule 18. The casing 16 can be the casing body itself or a lid secured to the open end of a container housing the electrode assembly, as is well known by those of ordinary skill in the art. The ferrule 18 is a cylindrically-shaped member hermetically secured to the casing in the opening, such as by welding. Preferably, the upper end of the ferrule is flush with the outer surface of the casing 16. The ferrule extends into the interior of the casing and supports an insulating glass surrounding the perimeter of a terminal lead.

As shown in the embodiment of FIG. 1, the ferrule 18 of the first glass-to-metal seal 12 extends into the interior of the casing 16 and supports a first insulating glass 20 surrounding the perimeter of a first terminal lead 22. Likewise, the ferrule 18 of the second glass-to-metal seal 14 extends into the interior of the casing 16 and supports a second insulating glass 24 surrounding the perimeter of a second terminal lead 26. The terminal leads 22, 26 are coaxial with the ferrule and both their proximal ends extend into the interior of the casing. The proximal ends are connected to one of the electrodes, typically the current collector of the cathode and/or the anode electrode. The other or distal ends of the terminal leads 22, 26 extend above the ferrule 18 and the outer surface of the casing 16 and provide for connection to at least one of the terminals of the load which the cell is intended to power.

The insulating glasses 20, 24 must be sufficiently insulative to electrically segregate the casing 12 from the terminal leads 22, 26 but be sealed to and between the ferrule 18 and the respective first and second terminal leads 22, 26. This sealing relationship must be sufficiently hermetic so that the cell is useful in applications such as powering implantable medical devices.

Figure 4:
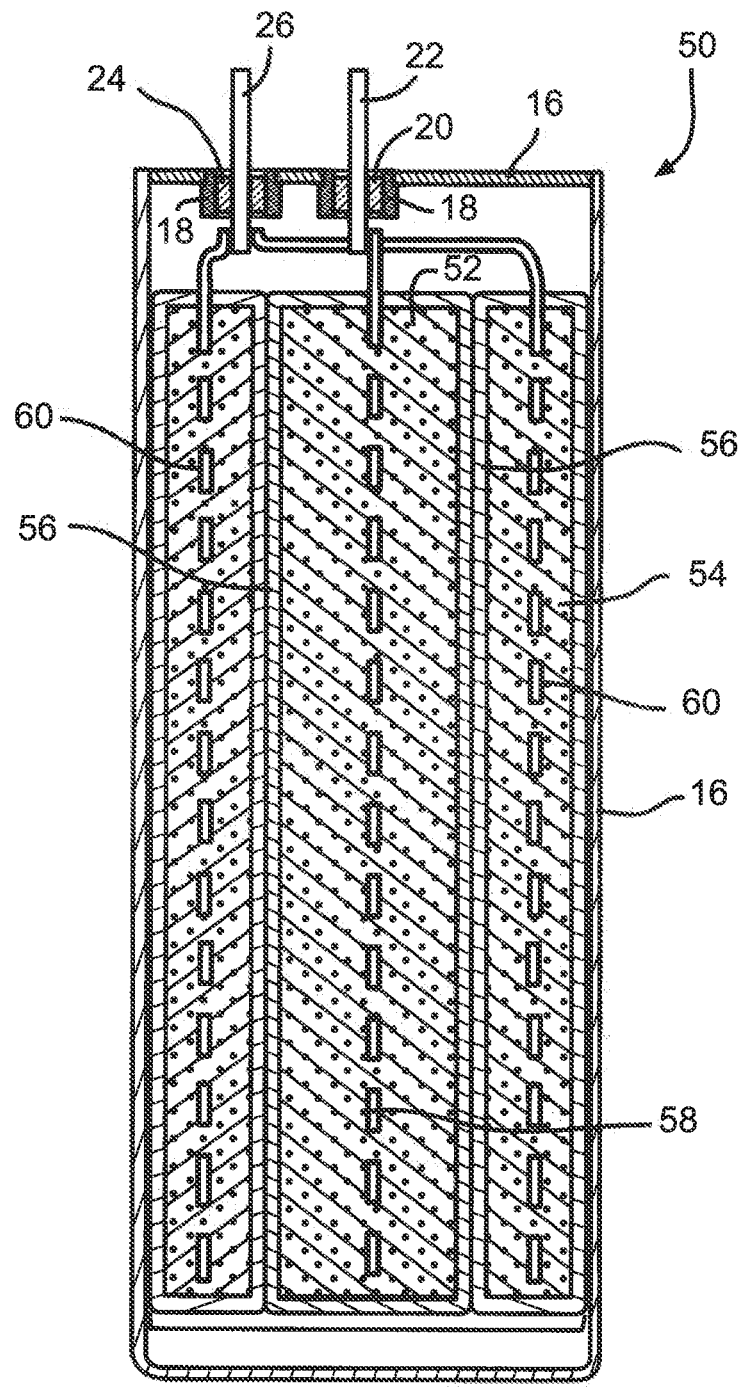
FIG. 4 shows a schematic of an exemplary electrochemical cell utilizing the multiple glass-to-metal seals of the present invention.

FIG. 2 shows an alternative embodiment of a combination of glass-to-metal seals 30 comprising at least a first glass-to-metal seal 32 and a second glass-to-metal seal 34 that are devoid of a ferrule. These assemblies include terminal leads that are sealed directly into an opening in the casing 16 or lid by intermediate insulating glasses. Similarly to the previous glass-to-metal seal 12, the first terminal lead 22 is sealed directly into an opening in the casing 16 by the intermediate first insulating glass 20 forming the first glass-to-metal seal 32 shown in FIG. 2. Likewise, the second terminal lead 26 is sealed directly into another opening in the casing 16 by the intermediate second insulating glass 24. Again, the casing can be the casing body itself or a lid for the casing, and the terminal leads 22, 26 are connected to the cathode and/or the anode of an electrochemical cell 50 (FIG. 4). In some embodiments, the casing may serve as the anode terminal for a case-negative cell design.

In that respect, the materials of construction for both the exemplary embodiments of the glass-to-metal seals 10, 30 shown in FIGS. 1 and 2 must meet the various criteria set forth above. The first and second terminal leads 22, 26 are preferably composed of an electrically conductive material. More preferably, the first and second terminal leads 22, 26 may be comprised of MP35N, stainless steel, titanium alloy, platinum, platinum alloys, palladium, palladium alloys or a refractory metal such as molybdenum. The casing 16 or lid is composed of a metallic material. More specifically, the casing 16 or lid may be comprised of stainless steel, such as 304L SS or a titanium alloy.

However, the present invention improves upon the prior art seals by utilizing insulating glasses of differing glass softening points. Furthermore, the glass-to-metal seals of the present invention are constructed in a specific sequence. The sequential order of construction of the seals is defined by the softening point of the individual insulating glasses comprising the set of glass-to-metal seals being created. The first glass-to-metal seal, of the set of seals, is constructed with the insulating glass having the highest softening point and the last glass-to-metal seal, of the set of seals, is constructed with the insulating glass having the lowest softening point. In other words, the first of the plurality of glass-to-metal seals is constructed with the insulating glass having the highest softening point among the plurality, the second glass-to-metal seal is constructed with the insulating glass having the second highest softening point among the plurality, the third glass-to-metal seal utilizes the insulating glass with the third highest softening point among the plurality, and so forth until all the desired glass-to-metal seals are created.

The term "glass softening point" is the minimum temperature at which a glass beings to deform under its own weight. As defined herein, the "glass softening point" is the temperature at which a glass fiber having a diameter between 0.55 to 0.75 mm and a length of 23.5 cm elongates under its own weight at a rate of 1 mm/min. The glass softening point has a viscosity of about $10^{7.6}$ poise. The term "glass working point" is herein defined as the temperature at which a glass has a viscosity of about $10^4$ poise. (*Fundamentals of Inorganic Glasses*, Arun K. Varshneya, 1994 p. 189)

The glass softening point is generally at a lower temperature than the glass working point. The temperature interval between the glass softening point and the glass working point is herein defined as the "glass working range". The term "viscosity" is herein defined as the resistance to flow in a fluid or semi-fluid. The term "heat treatment" or "heating profile" is herein defined as the application of heat starting from room temperature increasing in a controlled manner to a maximum temperature and then decreasing the application of heat in a controlled manner until room temperature is reached. The heat treatment or heating profile may comprise a plurality of different heating or cooling rates as well as a plurality of temperature plateaus at which a temperature is held constant for a period of time.

In a preferred embodiment, the softening temperatures of the first and second seal glasses 20, 24 of the glass to metal seals 12, 32 and 14, 34 are not equal. Preferably, the softening points of the first and second insulating glasses 20, 24 differ by at least 25° C. More preferably, the softening temperatures of the first and second insulating glasses 20, 24 differ by at least 50° C. and most preferably the softening points of the first and second insulating glasses 20, 24 differ by more than 100° C.

In a preferred embodiment, the first insulating glass 20 of the first glass-to-metal seal 12, 32 has a softening point ranging from about 825° C. to about 875° C., a working point ranging from about 1,000 to about 1100° C. and a working range temperature interval from about 175° C. to about 275° C. The second insulating glass preferably comprises a softening point ranging from about 690° C. to about 740° C., a working point ranging from about 775° C. to about 825° C. and a working range temperature interval from about 50° C. to about a 135° C.

Preferably the first insulating glass 20 comprises "TA-23" and the second insulating glass 24 comprises "Cabal-12". "Cabal-12" is a calcium-boro-aluminate type glass developed by Sandia National Labs. "TA-23" is an alkaline earth aluminosilicate type glass also developed by Sandia National Labs.

Figure 3:
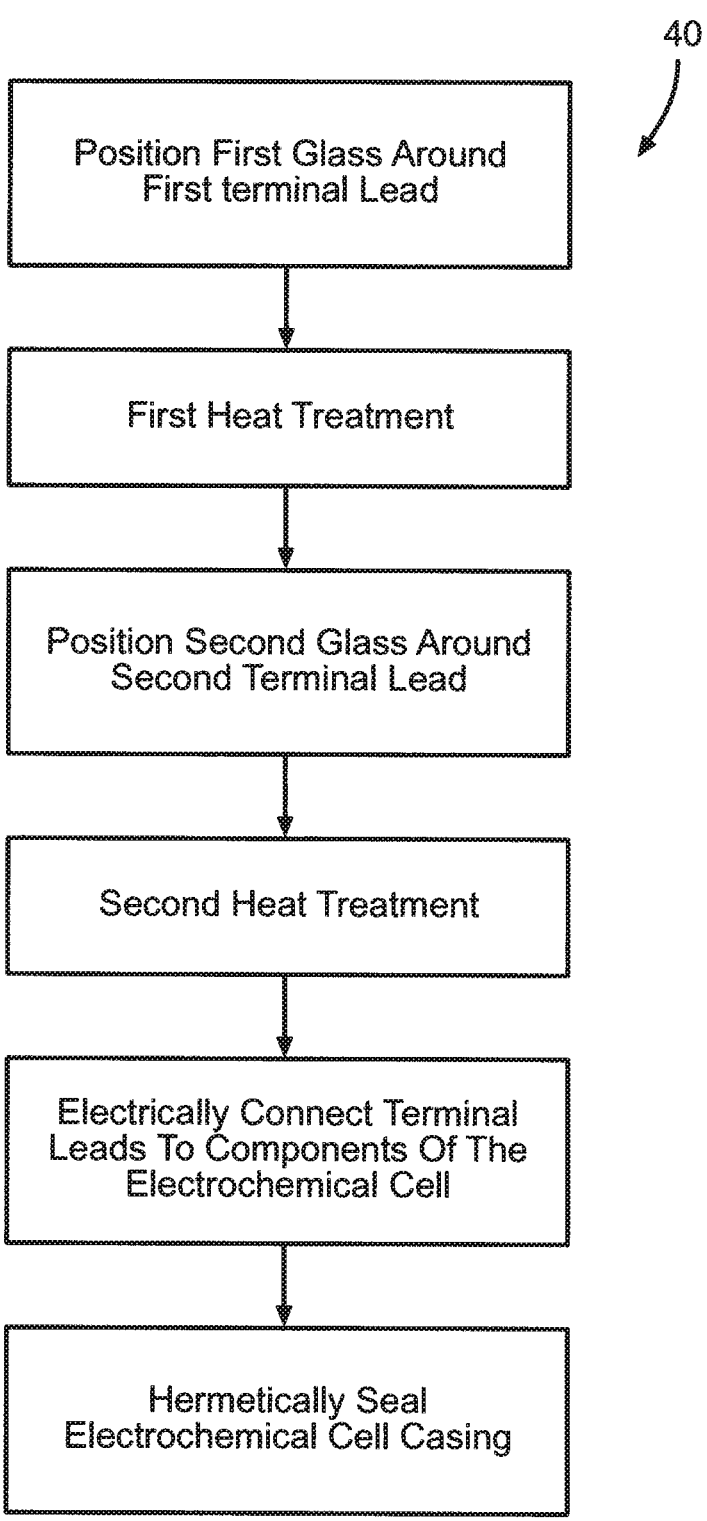
FIG. 3 is a flow chart illustrating an embodiment of the sequential order of manufacturing of the assembly of glass-to-metal seals of the present invention.

FIG. 3 shows a flow diagram of a method 40 of manufacturing an electrochemical cell 50 (FIG. 4) comprising a plurality of glass-to-metal seals of the present invention. The manufacturing method 40 comprises various steps needed to manufacture electrochemical cells comprising a multitude of terminal leads which are hermetically sealed within the casing of the cell. In the first step, the first glass 20 is positioned around the first terminal lead 22. The first insulating glass and first terminal lead assembly is positioned within the first opening of the lid 16.

Secondly, the first insulating glass 20, such as TA-23, and the first terminal lead 22 are then subjected to a first heat treatment. The first heat treatment softens the first glass 20 around the perimeter of the first lead terminal 22 and forms the first hermetic seal 12, 32 thereof upon cooling. The first heat treatment has a maximum temperature that lies within the working range of the first insulating glass 20. In a preferred embodiment, the maximum temperature of the first heat treatment ranges from about 900° C. to about 950° C.

After the first seal 12, 32 is formed, the second glass 24 is positioned around the perimeter of the second terminal lead 26. The assembly of the second insulating glass 24, such as Cabal-12, and second terminal lead 26 is fitted within a second opening of the lid 16. The combination of the second glass 24, second terminal lead 26, and the previously formed first hermetic seal. 12, 32 are then subjected to a second heat treatment. The second heat treatment has a maximum temperature that is lower than the maximum temperature of the first heat treatment. In a preferred embodiment, the second heat treatment has a maximum temperature that is lower than the softening point of the first insulating glass 20. This is to ensure that the first glass 20 does not soften or melt, during the formation of the second glass-to-metal seal 14, 34 thereby ensuring the hermetic integrity of the hermetic seal of the first glass-to-metal seal 12, 32 is not compromised.

In a preferred embodiment, the second heat treatment has a maximum temperature less than the softening point of the first insulating glass 20. In a preferred embodiment, the maximum temperature of the second heat treatment is selected within the working range of the second insulating glass 24. Most preferably, the maximum temperature of the second heat treatment ranges from about 750° C. to about 800° C.

After the second seal 14, 34 is formed, the process may be repeated such that a third and/or fourth glass-to-metal seal may be created within the same lid or casing 16 utilizing a third glass (not shown) and/or a fourth glass (not shown) of a lower melting temperature. Each of these combinations of insulating glass and terminal leads are subjected to further heat treatments having sequentially lower maximum temperatures. For example, the third heat treatment may have a maximum temperature ranging from about 675° C. to about 725° C. A fourth heat treatment may have a maximum temperature ranging from about 625° C. to about 650° C. it is contemplated that there could be a plurality of heat treatments such that the maximum temperature of the following heat treatment does not exceed the softening point of the previous insulating glass utilized.

Once the desired number of glass-to-metal seals comprising insulating glasses and terminal leads are created within the top portion of the casing or enclosure lid 16, the proximal end portions of one or more of the terminal leads are electrically connected to the desired components within the electrochemical cell 50 (FIG. 4). These components may include the current collector of the anode and/or the cathode as well as the casing of the cell itself.

After the terminal leads are electrically connected to the respective components within the electrochemical cell 50 (FIG. 4), the lid is hermetically sealed to the top portion of the casing 16. The lid may be hermetically sealed to the casing through such joining means as laser welding, resistance welding, ultrasonic welding, magnetic force welding, arc welding, soldering, or the like. The electrolyte of the cell is then generally injected into the casing 16 through an opening.

FIG. 4 illustrates an exemplary embodiment of an electrochemical cell 50 incorporating the plurality of glass-to-metal seals 10, 30 of the present invention. In addition to the casing 16, the electrochemical cell 50 further comprises a cathode electrode 52, an anode electrode 54, and a separator 56 therebetween. As shown, a cathode current collector 58 connects the cathode 52 to the first terminal lead 22. An anode current collector 60 connects the anode 54 to the casing 16 and/or the lid at the top of the cell 50. An electrolyte solution fills the casing 16 and provides a means for ion transfer between the anode 54 and the cathode 52.

In an alternate embodiment, the electrical connection of the first and second terminal leads 22, 24 may be switched such that the first terminal lead 22 of the first glass-to-metal seal 12, 32 is electrically connected to the anode current collector(s) 54 and the second terminal lead 26 is electrically connected to the cathode current collector(s) 58.

In a preferred embodiment, the anode active material is an alkali metal selected from Group IA of the Periodic Table of Elements and contacted to a nickel current collector, and the cathode active material is of a carbonaceous material, fluorinated carbon, metal, metal oxide, mixed metal oxide or a metal sulfide, and mixtures thereof. Preferably, the cathode material is mixed with a conductive diluent such as carbon black, graphite or acetylene black or metal powders such as nickel, aluminum, titanium and stainless steel, and with a fluoro-resin powder binder material such as powdered polytetrafluroethylene or powdered polyvinylidene fluoride. The thusly prepared cathode active mixture is contacted to the cathode current collector which is a thin sheet or metal screen, for example, a titanium, stainless steel, aluminum or nickel screen.

The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include woven and non-woven fabrics of polyolefinic fibers or fluoropolymeric fibers including polyvylidine fluoride, polyethylenetetrafluoroethylene, and polyethylenechlorotrifluoroethylene laminated or superposed with a polyolefinic or fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The exemplary cell of the present invention having the mismatched compression glass-to-metal seal is activated with an ionically conductive electrolyte which serves as a medium for migration of ions between the anode and the cathode electrodes during the electrochemical reactions of the cell. By way of example, a suitable electrolyte for an alkali metal active anode has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The ionically conductive salt serves as the vehicle for migration of the anode ions to intercalate or react with the cathode active material. Preferably the ion-forming alkali metal salt is similar to the alkali metal comprising the anode.

A preferred material for the casing is titanium although stainless steel, mild steel, nickel-plated mild steel and aluminum are also suitable. The casing header comprises a metallic lid having a sufficient number of openings to accommodate the glass-to-metal seal 10, 20 having the terminal lead 18, 22 connected to the cathode electrode. An additional opening is provided for electrolyte filling. The casing lid comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

Further, the cell of the present invention having the mismatched compression glass-to-metal seals 10, 30 is readily adaptable to secondary, rechargeable electrochemical chemistries. A typical negative electrode for a secondary cell is fabricated by mixing about 90 to 97 weight percent "hairy carbon" (U.S. Pat. No. 5,443,928 to Takeuchi et al.) or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCO_{0.92}SnO_{0.08}O_2$ and $LiCo_{1-x}Ni_xO_2$. The secondary cell chemistry is activated by the previously described electrolytes.

To charge such secondary cells, the lithium metal comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

It is appreciated that various modifications to the invention concepts described herein may be apparent to those skilled in the art without departing from the spirit and the scope of the present invention defined by the hereinafter appended claims.

What is claimed is:

1. An electrochemical cell, the cell comprising:
   a) an anode and a cathode separated from direct physical contact with each other by a separator housed inside a casing and activatable with an electrolyte; and
   b) one of the anode and the cathode being electrically connected to a first terminal lead insulated from the casing by a first glass-to-metal seal comprising a first insulating glass extending to and contacting the first terminal lead and an inner surface of a first opening of a first support portion of the casing, wherein the first insulating glass has a first glass softening point, and the other of the anode and cathode being electrically connected to a second terminal lead insulated from the casing by a second glass-to-metal seal comprising a second insulating glass extending to and contacting the second terminal lead and an inner surface of a second opening of a second support portion of the casing spaced from the first support portion, wherein the second insulating glass has a second glass softening point less than the first glass softening point; and c) wherein the first and second softening points differ by more than 25° C.

2. The electrochemical cell of claim 1 wherein the first softening point of the first insulating glass ranges from about 825° C. to about 875° C.

3. The electrochemical cell of claim 1 wherein the second softening point of the second insulating glass ranges from about 690° C. to about 740° C.

4. The electrochemical cell of claim 1 wherein the first softening point of the first insulating glass and the second softening point of the second insulating glass differ by more than about 100° C.

5. The electrochemical cell of claim 1 wherein the first insulating glass comprises TA-23 and the second insulating glass comprises Cabal-12.

6. The electrochemical cell of claim 1 of either a primary or a secondary chemistry.

7. The electrochemical cell of claim 1 of a primary chemistry having the anode of an alkali metal and the cathode of a cathode active material selected from the group consisting of a carbonaceous material, a fluorinated carbon, a metal, a metal oxide, a mixed metal oxide, a metal sulfide, and mixtures thereof.

8. The electrochemical cell of claim 1 of a secondary chemistry having the anode of carbon or graphite and the cathode of a cathode active material selected from the group consisting of $LiNiO_2$, $LiMn_2O_4$, $LiCoO_2$, $LiCo_{0.92}Sn_{0.08}O_2$ and $LiCo_{1-x}Ni_xO_2$.

9. The electrochemical cell of claim 1 wherein the casing is selected from the group consisting of titanium, stainless steel, mild steel, nickel-plated mild steel, and aluminum.

10. An assembly of glass-to-metal seals, which comprises:
a) a first insulating glass having a first glass softening point, and a second insulating glass having a second glass softening point less than the first glass softening point;
b) a first terminal lead and a second terminal lead;
c) a first support portion spaced from a second support portion, wherein the first insulating glass extends between and seals to the first terminal lead and an inner surface of a first opening of the first support portion and the second insulating glass extends between and seals to the second terminal lead and an inner surface of a second opening of the second support portion; and
d) wherein the first insulating glass softening point and the second insulating glass softening point differ by more than 25° C.

11. The assembly of claim 10 wherein the first glass softening point ranges from about 825° C. to about 875° C.

12. The assembly of claim 10 wherein the second glass softening point ranges from about 690° C. to about 740° C.

13. The assembly of claim 10 wherein the first glass softening point and the second glass softening point differ by more than about 100° C.

14. The assembly of claim 10 wherein the first and second support portions comprise a lid for an electrochemical cell casing.

15. The assembly of claim 10 wherein the first glass softening point and the second glass softening point differ by more than about 100° C.

16. The assembly of claim 10 wherein the first insulating glass comprises TA-23 and the second insulating glass comprises Cabal-12.

17. The electrochemical cell of claim 1 wherein the first and second support portions comprise a lid for the casing.

18. The electrochemical cell of claim 1 wherein the first support portion comprises a first ferrule positioned within a lid of the casing and the second support portion comprises a second ferrule positioned within the lid of the casing.

19. The assembly of glass-to-metal seals of claim 10 wherein the first support portion comprises a first ferrule positioned within a lid of a casing of an electrochemical cell and the second support portion comprises a second ferrule positioned within the lid of the casing of the electrochemical cell.

20. An electrochemical cell, the cell comprising:
a) an anode and a cathode separated from direct physical contact with each other by a separator housed inside a casing and activatable with an electrolyte;
b) one of the anode and the cathode being electrically connected to a first terminal lead insulated from the casing by a first glass-to-metal seal comprising a first insulating glass extending to and contacting the first terminal lead and an inner surface of a first opening of a first support portion of the casing, wherein the first insulating glass comprises a first glass softening point that ranges from about 825° C. to about 875° C., and the other of the anode and cathode being electrically connected to a second terminal lead insulated from the casing by a second glass-to-metal seal comprising a second insulating glass extending to and contacting the second terminal lead and an inner surface of a second opening of a second support portion of the casing spaced from the first support portion, wherein the second insulating glass comprises a second glass softening point that ranges from 690° C. to about 740° C.

21. The electrochemical cell of claim 20 wherein the first and second support portions comprise a lid for the casing.

22. The electrochemical cell of claim 20 wherein the first support portion comprises a first ferrule positioned within a lid of the casing and the second support portion comprises a second ferrule positioned within the lid of the casing.

23. The electrochemical cell of claim 20 of either a primary or a secondary chemistry.

24. The electrochemical cell of claim 20 of a primary chemistry having the anode of an alkali metal and the cathode of a cathode active material selected from the group consisting of a carbonaceous material, a fluorinated carbon, a metal, a metal oxide, a mixed metal oxide, a metal sulfide, and mixtures thereof.

25. The electrochemical cell of claim 20 of a secondary chemistry having the anode of carbon or graphite and the cathode of a cathode active material selected from the group consisting of $LiNiO_2$, $LiMn_2O_4$, $LiCoO_2$, $LiCo_{0.92}Sn_{0.08}O_2$ and $LiCo_{1-x}Ni_xO_2$.

26. The electrochemical cell of claim 20 wherein the casing is selected from the group consisting of titanium, stainless steel, mild steel, nickel-plated mild steel, and aluminum.

27. The electrochemical cell of claim 20 wherein the first glass comprises TA-23 and the second glass comprises Cabal-12.

28. The electrochemical cell of claim 20 wherein the first insulating glass comprises a first working point that ranges from about 1,000° C. to about 1,100° C. and the second insulating glass comprises a second working point that ranges from 775° C. to about 825° C.

* * * * *